United States Patent
Taft et al.

(10) Patent No.: US 8,174,627 B2
(45) Date of Patent: May 8, 2012

(54) SELECTIVELY MASKING IMAGE DATA

(75) Inventors: Frederick D. Taft, Corvallis, OR (US); Kenneth H. Bronstein, Corvallis, OR (US); David H. Ochs, Corvallis, OR (US); James R. Andreas, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 655 days.

(21) Appl. No.: 11/220,036

(22) Filed: Sep. 6, 2005

(65) Prior Publication Data

US 2007/0052871 A1   Mar. 8, 2007

(51) Int. Cl.
*H04N 3/23* (2006.01)

(52) U.S. Cl. .................. 348/746; 348/555; 348/841

(58) Field of Classification Search .......... 348/744, 348/747, 581, 576, 556, 561, 596, 591, 597, 348/569, 554, 555, 557, 558, 841, 842, 563, 348/564, 745, 746; 345/433, 523

See application file for complete search history.

(56) References Cited

U.S. PATENT DOCUMENTS

| | | | |
|---|---|---|---|
| 5,784,123 A | 7/1998 | Yoshimi | |
| 5,999,220 A | 12/1999 | Washino | |
| 6,081,246 A | 6/2000 | Cathey et al. | |
| 6,300,955 B1 * | 10/2001 | Zamir | 382/283 |
| 6,366,263 B1 | 4/2002 | Takasu et al. | |
| 6,411,305 B1 | 6/2002 | Chui | |
| 6,670,983 B2 * | 12/2003 | Abe | 348/65 |
| 6,678,009 B2 * | 1/2004 | Kahn | 348/569 |
| 6,733,139 B2 | 5/2004 | Childers et al. | |
| 6,788,347 B1 | 9/2004 | Kim et al. | |
| 6,806,888 B2 * | 10/2004 | Bhogal et al. | 345/660 |
| 7,116,379 B2 * | 10/2006 | Suzuki | 348/747 |
| 2002/0003543 A1 | 1/2002 | Deering | |
| 2002/0089521 A1 | 7/2002 | Maruyama et al. | |
| 2002/0180727 A1 | 12/2002 | Guckenberger et al. | |
| 2004/0085481 A1 | 5/2004 | Osawa | |
| 2004/0100590 A1 | 5/2004 | Childers | |
| 2004/0145595 A1 | 7/2004 | Bennett | |
| 2004/0150747 A1 | 8/2004 | Sita | |

\* cited by examiner

Primary Examiner — M. Lee (57) ABSTRACT

Apparatus and methods for selectively masking image data and inhibiting projection of light corresponding to the masked image data. Projection devices include a light engine to project light onto a surface within an available field of projection and a processing unit configured to selectively mask image data in response to user input defining a desired field of view. The masked image data is that image data corresponding to areas outside the desired field of view.

17 Claims, 7 Drawing Sheets

SELECTIVELY MASKING IMAGE DATA

BACKGROUND

Projectors are generally devices that integrate light sources, optics systems, electronics, and displays for projecting images from computers or video devices onto walls or screens, for large-image viewing. They are especially popular among business users who give presentations as part of their job responsibilities. Newer projectors can weigh as little as a few pounds, making them well suited for business travelers. As the quality of projection technology has improved, projectors are also finding their way into peoples' homes for high-definition television (HDTV) and other home entertainment applications.

The quality of the signals connected to a projection device can greatly vary between a "clean" signal and a "noisy" signal. Clean signals typically can be displayed without any "trash" appearing along the edges of the projected image; noisy signals, on the other hand, frequently have noise, or flicker, along one or more edges of the projected image.

Arbitrarily clipping of a portion of the picture has been used to address these noisy edges. Unfortunately, this results in a loss of a portion of the picture, even if it is not necessary.

DETAILED DESCRIPTION

In the following detailed description of the present embodiments, reference is made to the accompanying drawings that form a part hereof, and in which is shown by way of illustration specific embodiments of the disclosure that may be practiced. These embodiments are described in sufficient detail to enable those skilled in the art to practice the subject matter of the disclosure, and it is to be understood that other embodiments may be utilized and that process, electrical or mechanical changes may be made without departing from the scope of the present disclosure. The following detailed description is, therefore, not to be taken in a limiting sense, and the scope of the present disclosure is defined by the appended claims and equivalents thereof.

An apparatus in accordance with one embodiment includes a light engine to project spots of light onto a surface in response to input image data, and a processing unit configured to remove portions of the input image data from projection in response to user input.

For one embodiment, the apparatus is adapted to store user input associated with a given source of input image data and to use the stored user input to remove portions of the input image data without further user input.

Projection devices may be used in front projection systems, where a displayed image is viewable to a user as light reflected from the surface, or rear projection systems, where a displayed image is viewable to a user as light transmitted through the surface. Regardless of whether front projection or rear projection is used, some form of light engine is utilized to generate rays of light to be reflected from a viewing surface associated with a display, or transmitted through a viewing surface, respectively. One type of light engine utilizes a light source, a color wheel and a spatial light modulator. Such light engines produce color in a manner typically referred to as "field sequential color." Light generated from the light source is directed onto the color wheel, which sequentially filters light from the light source. The color wheel typically generates a sequence of primary colors of light: red, green and blue, and optionally also generates white light in sequence. The red, green, white and blue colors of light are sequentially sent to the spatial light modulator, which spatially modulates the colored light depending on the image data by controlling the intensity of each color of light at individual positions in the projected image. The modulated color sub-fields are projected in a sequence at a rapid rate onto a viewing surface, and the human eye integrates the sequences of color sub-fields and a continuous image that is perceived to be flicker-free can be projected.

For such systems, projected intensity and color for a given pixel is determined by its modulation, i.e., an amount of light the spatial modulator allows to be delivered to the viewing surface at the location corresponding to the given pixel. Some light modulators, such as digital micro-mirror (DMD) devices modulate light intensity in the time domain. Tiny micro-mirrors, one for each image pixel, oscillate and alternatively direct light onto the screen at each pixel position or direct the light into a trap or absorber. The intensity of projected light corresponds to the duty cycle of the mirrors. In field sequential systems, mirrors independently modulate intensity of each color sub-field. As one example, a greatest intensity achievable in an embodiment of a light engine for red light could be achieved by holding a mirror in the "ON" position for the entire time period during which the red filter is between the light source and the spatial modulator; a half intensity for red light could be achieved by oscillating the mirror such that it was in the "ON" position for half the time period the red filter is between the light source and the spatial modulator and in the "OFF" position the other half of the time period. It is noted that light engines sometimes do not allow projection of light through the spatial modulator during the entire time period during which each color filter is between the light source and the spatial modulator in order to facilitate better separation of colors by blocking projection of light during transition from one filter segment to the next.

Other systems may employ an array of light emitting diodes (LEDs), or lasers capable of scanning rays of light across the viewing surface, as their light engine. In a similar manner, hue, colorfulness and brightness are generally controlled by modulating the amount of power delivered of each primary color to a spot on the viewing surface corresponding to a location in the input image data. The embodiments of the invention, however, are suitable for use with each of these light modulation techniques as well as others.

Figure 1:
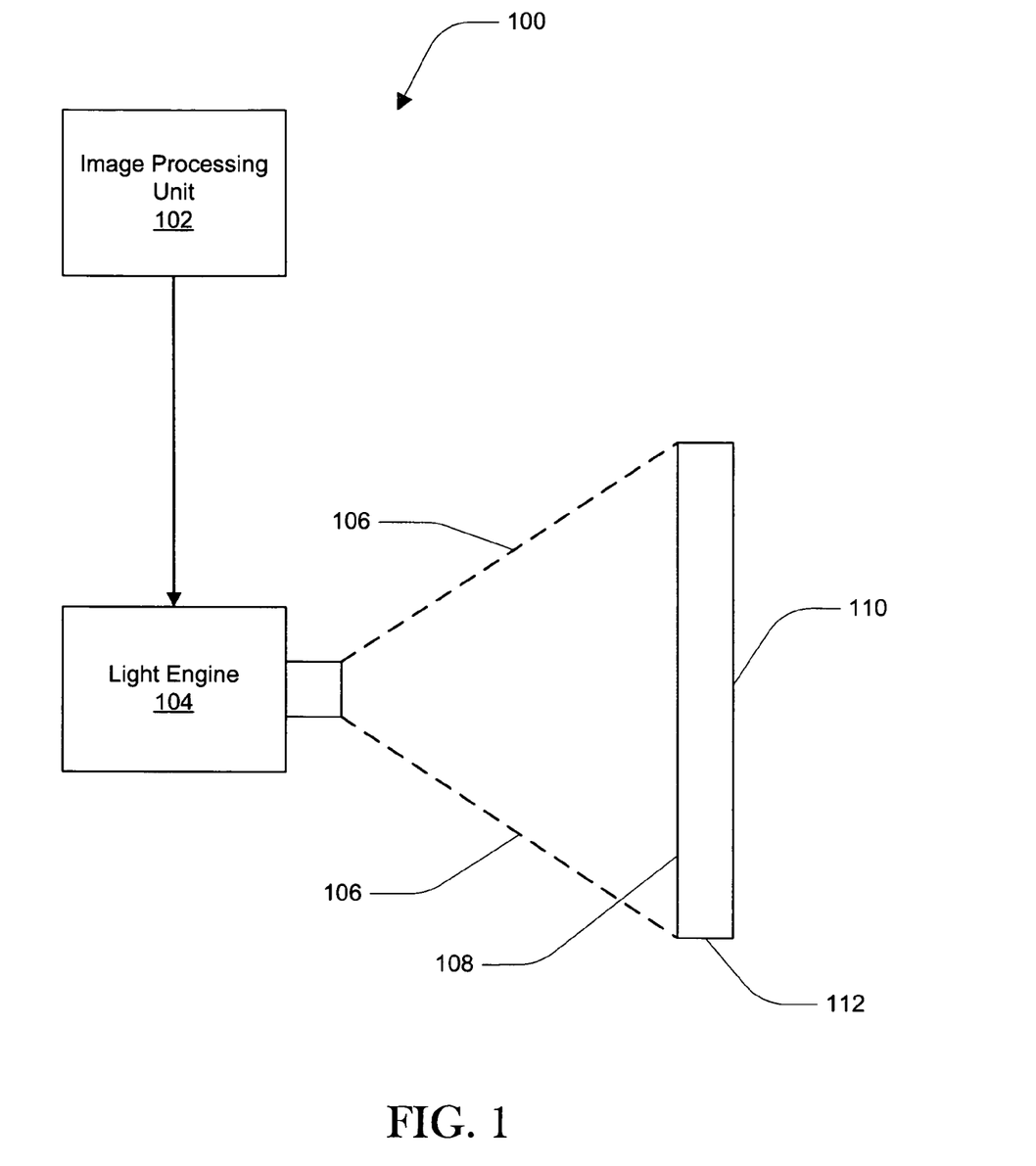
FIG. 1 is a schematic of an embodiment of a projection system in accordance with one embodiment of the present disclosure.

FIG. 1 is a schematic of an embodiment of a projection system 100 in accordance with one embodiment of the present disclosure. The projection system 100 includes an image processing unit 102 for control of the light modulation of the light engine 104 for projection on the display screen 112. The image processing unit 102 receives incoming image data and provides control signals for the light engine 104. The image processing unit 102 and light engine 104 may be considered a projection device.

The light engine 104 generally defines spots of light on the screen 112 by projecting rays of light, represented generally by dashed lines 106, onto projection surface 108 of screen 112. The rays of light 106 generally are in either a fixed matrix pattern or are scanned across the viewing surface and are modulated in response to control signals received from the image processing unit 102. For a front-projection system, an image is viewable as light reflected from the projection surface 108 of screen 112. For a rear-projection system, an image is viewable as light transmitted through screen 112 to surface 110.

Figure 2:
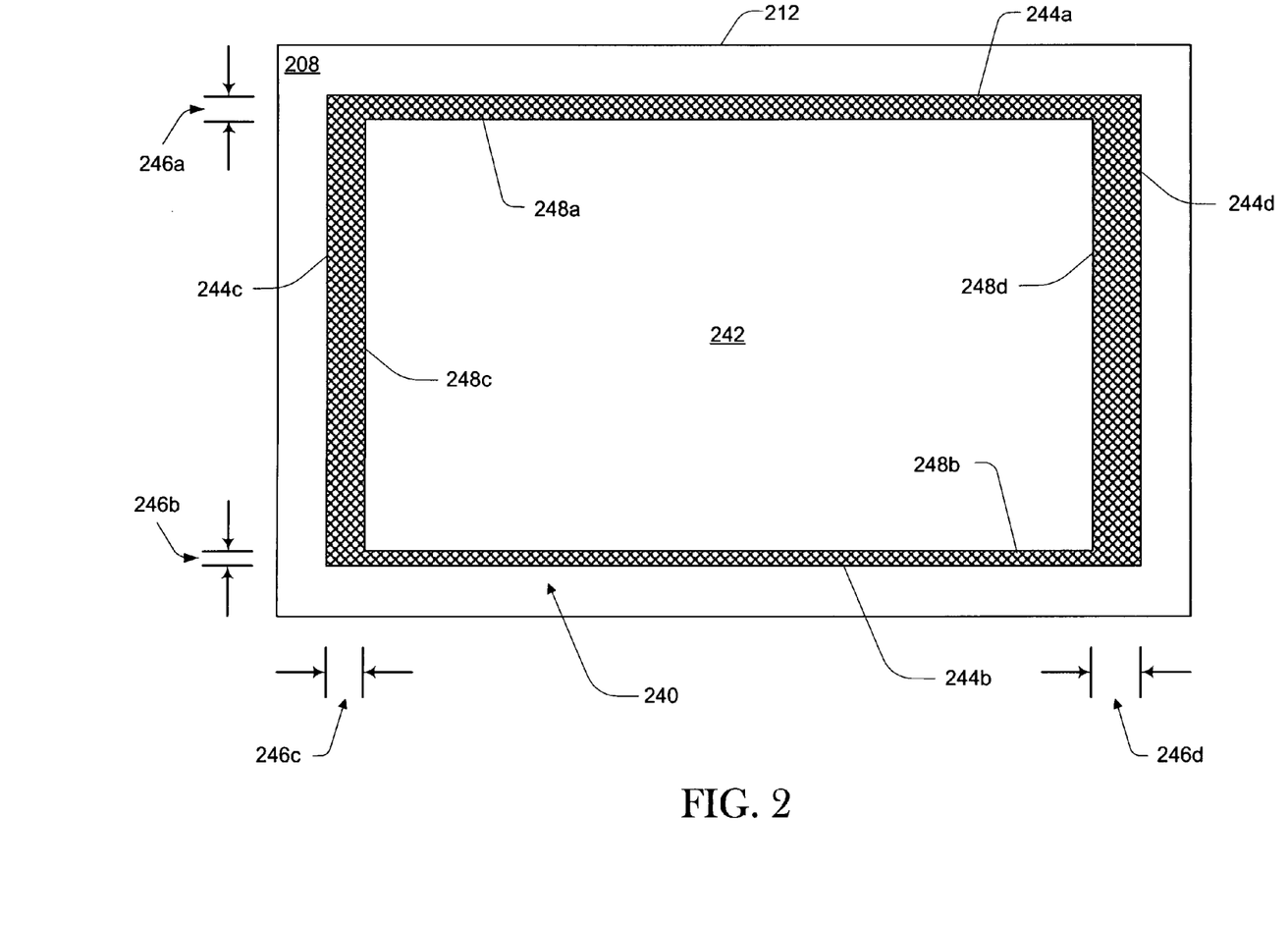
FIG. 2 is a representation of one embodiment of a screen having a projection surface in accordance with one embodiment of the present disclosure.

FIG. 2 is a representation of one embodiment of a screen 112 having a projection surface 208. A light engine (not shown in FIG. 2) may be adapted to project light in the form of an available field of projection 240 onto the projection surface 208. The available field of projection 240 represents the portion of the projection surface 208 that may be illuminated by a spot of light from the light engine. The available field of projection 240 may generally be adjusted by a user by adjusting the projection optics of the light engine and a distance between the screen 212 and the projection optics of the light engine.

Noise or other signal irregularities may degrade portions of the available field of projection 240. This is particularly true in edge portions, where such signal irregularities can result in flicker. The resulting flicker may affect different edges of a displayed image to different degrees; some edges may show no signs of degradation while others may have significant flicker extending well into the available field of projection 240. To address this issue, various embodiments facilitate clean-up of edges independently of other edges by selectively masking input image data such that projection of light corresponding to that image data is inhibited. Masking input image data may include ignoring, replacing or otherwise modifying that image data when generating control signals for the light engine in a manner to inhibit projection of light corresponding to that image data. For some embodiments, masking input image data includes rescaling the image such that projection pixels corresponding to the masked input image data fall outside the available field of projection and are, therefore, inhibited. For other embodiments, projection of light for image pixels corresponding to the masked input image data is simply inhibited within the available field of projection. It is noted that, within the available field of projection, inhibiting projection of light does not necessarily mean that all light is blocked. As used herein, inhibiting projection of light refers to reducing projection of light to below an intensity called for by input image data and any transfer functions of the projection device, and generally to an intensity level that would be imperceptible to a casual viewer such that distracting aspects of edge degradation are effectively removed from view. Transfer functions may be used to adjust the output intensity of the light engine as a function of the intensity called for by the input image data, often in a non-linear relationship, to facilitate enhancements in perceived image quality.

As shown in FIG. 2, the available field of projection 240 may have image degradation at its edges 244a, 244b, 244c and/or 244d represented by the cross-hatched region. While the embodiment of FIG. 2 depicts degradation on all edges 244, input image signals may not result in any edge degradation or they may contain noise affecting any combination of one or more of the edges 244. The affected areas of degradation along edges 244a, 244b, 244c and 244d have widths of 246a, 246b, 246c and 246d, respectively. It is noted that the areas of degradation are subjective to a viewer, or user, of the projected image in that they represent areas within the available field of projection 240 that the viewer may find distracting and, therefore, areas that the viewer would desire not to project. Note that if an area of degradation does not exist along any single edge, its corresponding width is zero.

Bounded by the areas of degradation along edges 244a, 244b, 244c and 244d, a desired field of view 242 is defined. This represents the portion of a projected image that the viewer would desire to see. The desired field of view 242 has an edge 248a set back from edge 244a of the available field of projection 240 by the width 246a, an edge 248b set back from edge 244b of the available field of projection 240 by the width 246b, an edge 248c set back from edge 244c of the available field of projection 240 by the width 246c, and an edge 248d set back from edge 244d of the available field of projection 240 by the width 246d.

Figure 3:
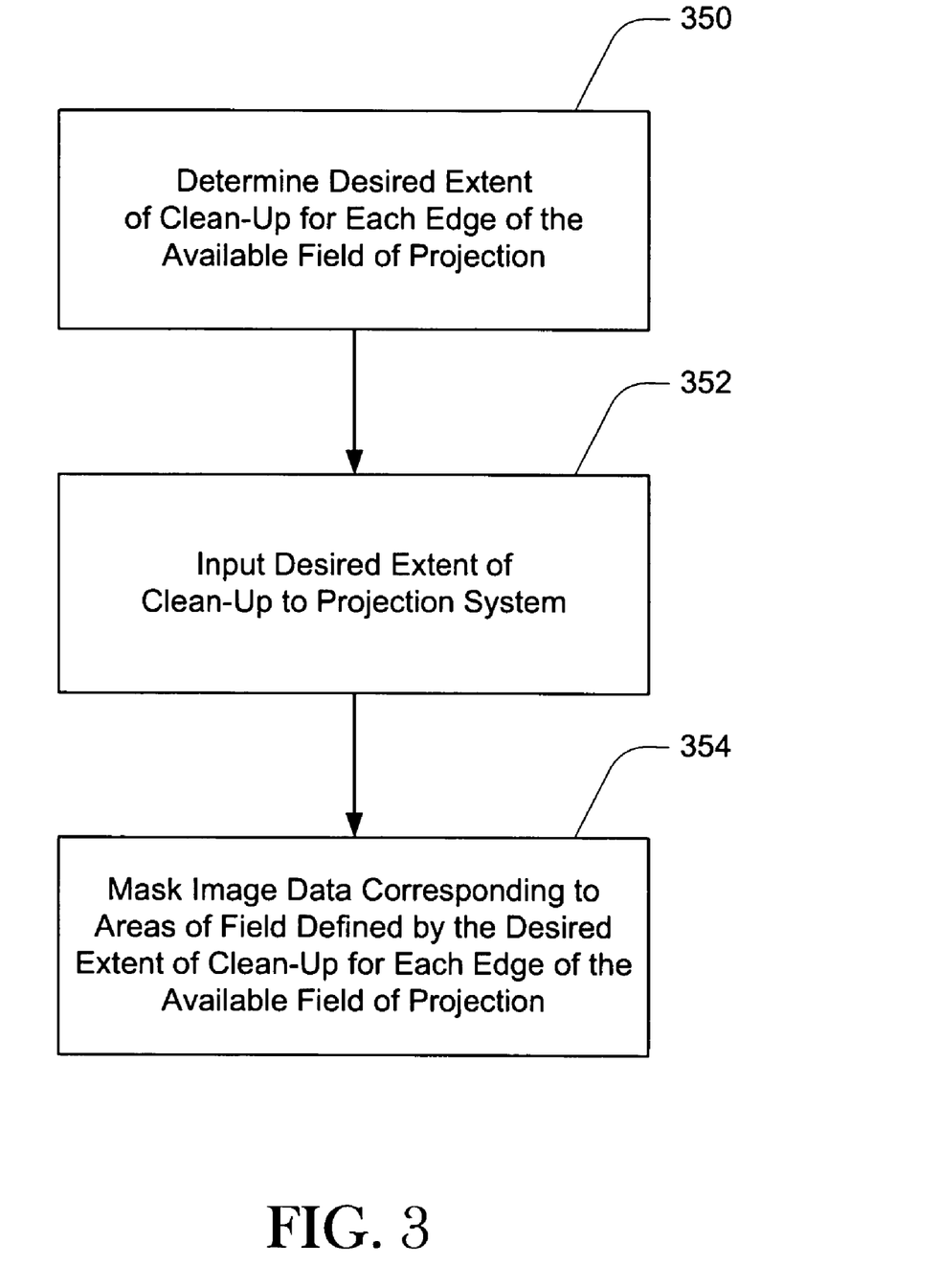
FIG. 3 is a flowchart of one embodiment of a method of operating a projection device in accordance with one embodiment of the present disclosure.

FIG. 3 is a flowchart of one embodiment of a method of operating a projection device in accordance with one embodiment of the present disclosure. At 350, a viewer determines a desired extent of clean-up for each edge of the available field of projection. The desired extent of clean-up represents the portions of an image within the available field of projection that the viewer does not care to perceive. Typically, this would be those areas of a projected image that are exhibiting distracting levels of flicker or other image degradation, such as distortion of lines, hue, intensity, etc. However, the viewer may have other reasons for blocking portions of a projected image from view, such as the elimination of a news crawl, caption, date stamp, etc.

The determination of the desired extent of clean-up would generally result from the viewer viewing a projected image, observing the edge portions and deciding how much of those edge portions should be removed from viewing. However, the user may determine the desired extent of clean-up without viewing a projected image. For example, the viewer may be familiar with a source of image data and may base their determination of desired extent of clean-up merely upon their knowledge of the source. Or the viewer may simply determine the desired extent of clean-up arbitrarily. The desired extent of clean-up may be expressed in any suitable scale or format. For example, the desired extent of clean-up may be expressed in terms of a percent of width or height of the available field of projection or some other numeric scale that can be mapped to the available field of projection. Alternatively, a grid or other marker could be projected onto the projection surface to aid the viewer in defining the desired extent of clean-up in a form for input to a projection system.

At 352, the desired extent of clean-up is input to the projection system independently for each edge of the available field of projection. The input may be made to the projection system through any number of user-interface devices, such as keypads, dials, up/down buttons, touch-screen sliders, or others. For example, if a viewer desired to inhibit projection of light for an edge equal to 2% of the width of the available field of projection, the viewer could type "2" into a keypad, turn a dial until the user-interface of the projection system displayed 2%, tap up/down buttons until the user-interface of the projection system displayed 2%, etc. Such input means are well known, and may be incorporated directly on the projection system or may be used remotely, such as by using a remote control or entering data through a host, such as a personal computer, for communication to the projection system. Alternatively, as will be described in more detail later, a line or other marker could be superimposed onto the projected image in the available field of projection or onto a representation of the available field of projection, and the viewer could drag the marker to the desired extent of clean-up. Again, such input could be performed directly or remotely.

At 354, image data is masked corresponding to those portions of the field defined by the desired extent of clean-up for each edge of the available field of projection. This can be accomplished by a variety of methods. For example, image data corresponding to pixels within the defined portions may be replaced with data indicative of a desire to project the lowest intensity for each color within the capabilities of the light engine. The lowest intensity within the capabilities of the light engine may not be an absence of light, but would generally be of sufficiently low intensity as to not be readily perceived by a viewer under normal viewing conditions. Alternatively, the modulators corresponding to pixels within the defined portions may be overridden to assume a state of lowest intensity within the capabilities of the light engine without regard for the image data. As will be described later, all or a portion of the masked image data could be ignored when generating the projected image. Such embodiments permit full use of the available field of projection while removing distracting portions of the image data from view. Other methods of inhibiting light corresponding to the masked image data from projecting onto the available field of projection may also be used.

Although the process flow of FIG. 3 may be performed sequentially, such elements of the process may also be performed substantially concurrently. For example, an unaltered image may be displayed to a viewer who then begins to input a desired extent of clean-up for an edge, such as by dialing a knob, adjusting a sliding scale, using a keypad, pressing an up/down key, etc. In response to this input, the image could be displayed without the masked image data as determined by the viewer input. The viewer would determine the desired extent of clean-up by watching the displayed image in response to their input, and stopping when the objectionable portions of the image have been removed. The viewer could then proceed similarly on any remaining edges. For a further embodiment, as more than one edge is masked, the displayed image could be adjusted to permit full use of the available field of projection as will be described later.

Figure 4:
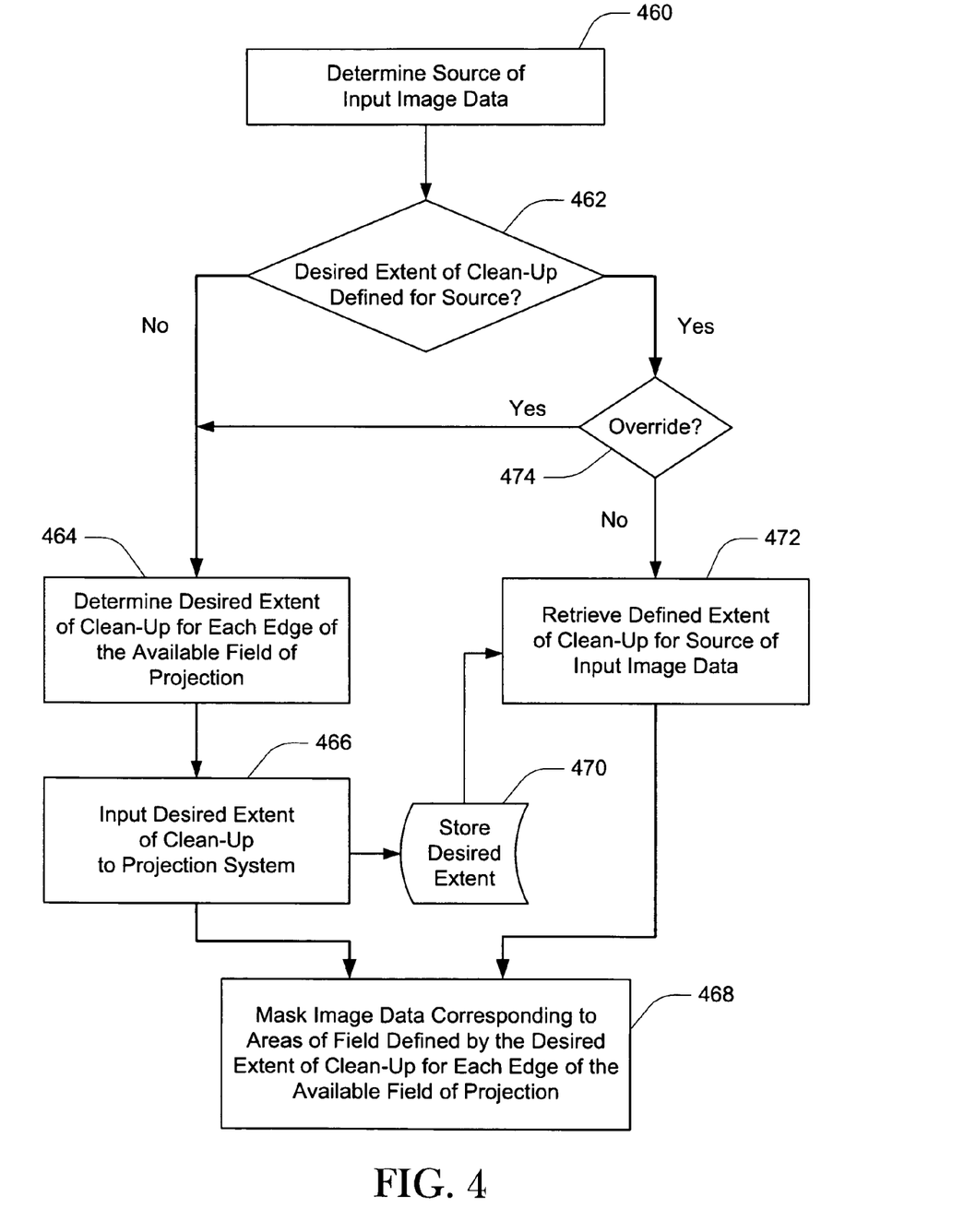
FIG. 4 is a flowchart of one embodiment of a method of operating a projection device in accordance with another embodiment of the present disclosure.

It is recognized that some sources of input image data, such as a broadcast signal, cable signal, HD signal, DVD player, etc., may exhibit consistent edge degradation over time. In such cases, the ability to store and retrieve data indicative of a desired extent of clean-up would be advantageous. FIG. 4 is a flowchart of one embodiment of a method of operating a projection device in accordance with another embodiment of the present disclosure.

At 460, a source of the input image data is determined. Various signal types often have differing protocols. These protocols define header information or other identifying characteristics embedded within the signal to permit a receiving device to recognize whether it is properly equipped to decode the incoming signal. Such header information can be used to identify a source of the input image data. Alternatively, the source of input image data may be determined by the physical connection through which the data is received. For example, the projection system may receive image data through an S-video connection, a coaxial connection, an optical connection, etc. Each connection type may be deemed to correspond to a unique source of input image data.

At 462, it is determined whether the desired extent of clean-up is already defined for the identified source. If not, the process would proceed to 464. Optionally, even if the desired extent of clean-up is already defined for a source, a viewer may be given a choice of whether to override that data at 474. Thus, if a viewer decided to re-define the desired extent of clean-up at 474, the process would continue at 464. However, if the viewer decided to utilize the previously defined data, or was not given the opportunity to override, the process would continue at 472.

At 464, the viewer determines a desired extent of clean-up for each edge of the available field of projection. The desired extent of clean-up represents the amount of the available field of projection that the viewer does not care to perceive, as was described with reference to FIG. 3. At 466, the desired extent of clean-up is input to the projection system independently for each edge of the available field of projection. At 468, image data is masked corresponding to those portions of the field defined by the desired extent of clean-up for each edge of the available field of projection. The guidelines for input of desired extent and masking image data as described with reference to FIG. 3 also apply to the methods of FIG. 4. Upon input of the desired extent of clean-up for the identified source at 466, this information could be stored at 470, if desired, for future use when this source is again identified.

If it is determined at 462 that the desired extent of clean-up has already been stored in 470, and there is either no option or desire to override that data, the process could retrieve this information at 472. The process would then proceed to 468 as already described.

Figure 5A:
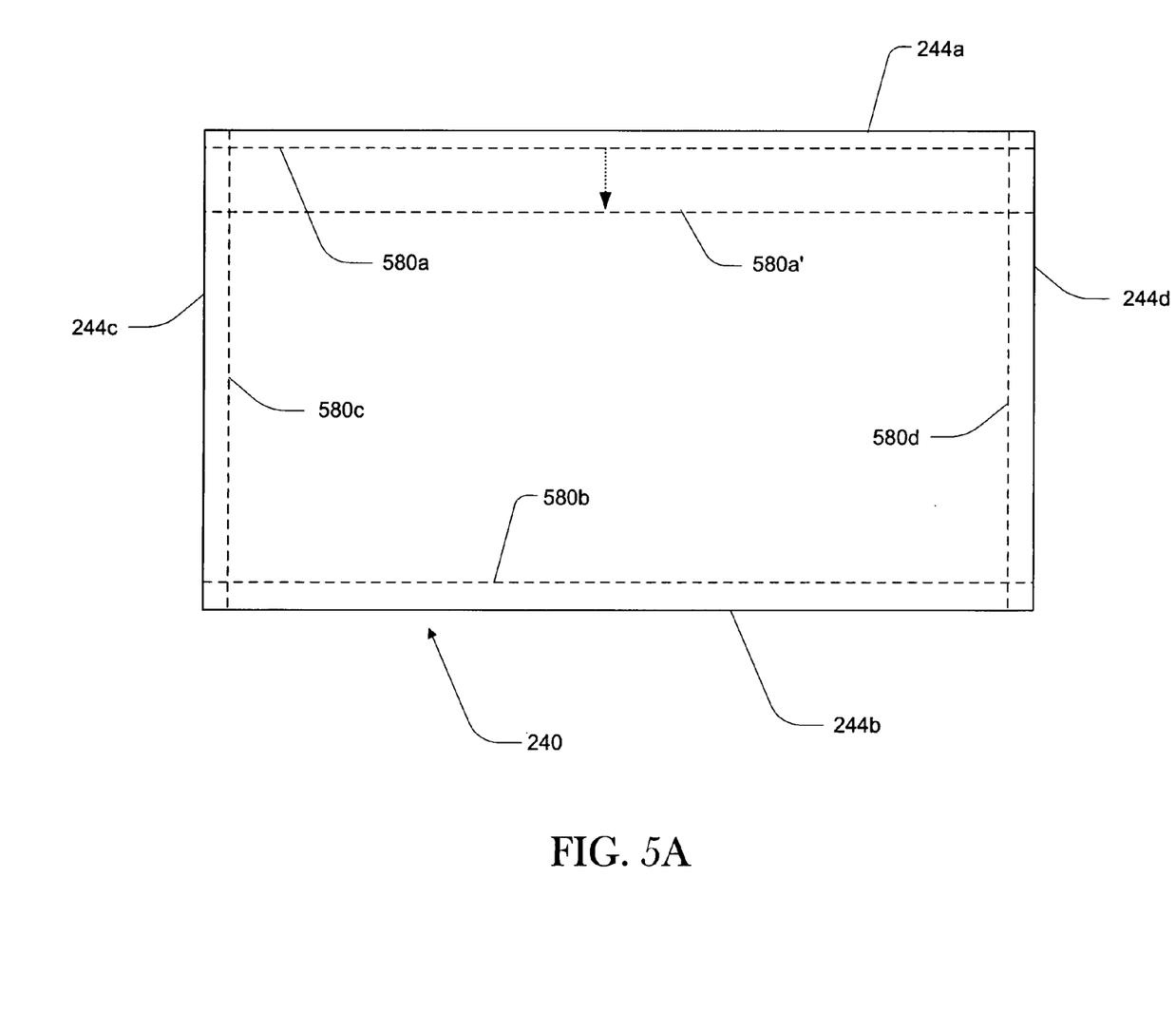
FIGS. 5A-5B are representations of embodiments of available fields of projection in accordance with embodiments of the disclosure.
Figure 5B:
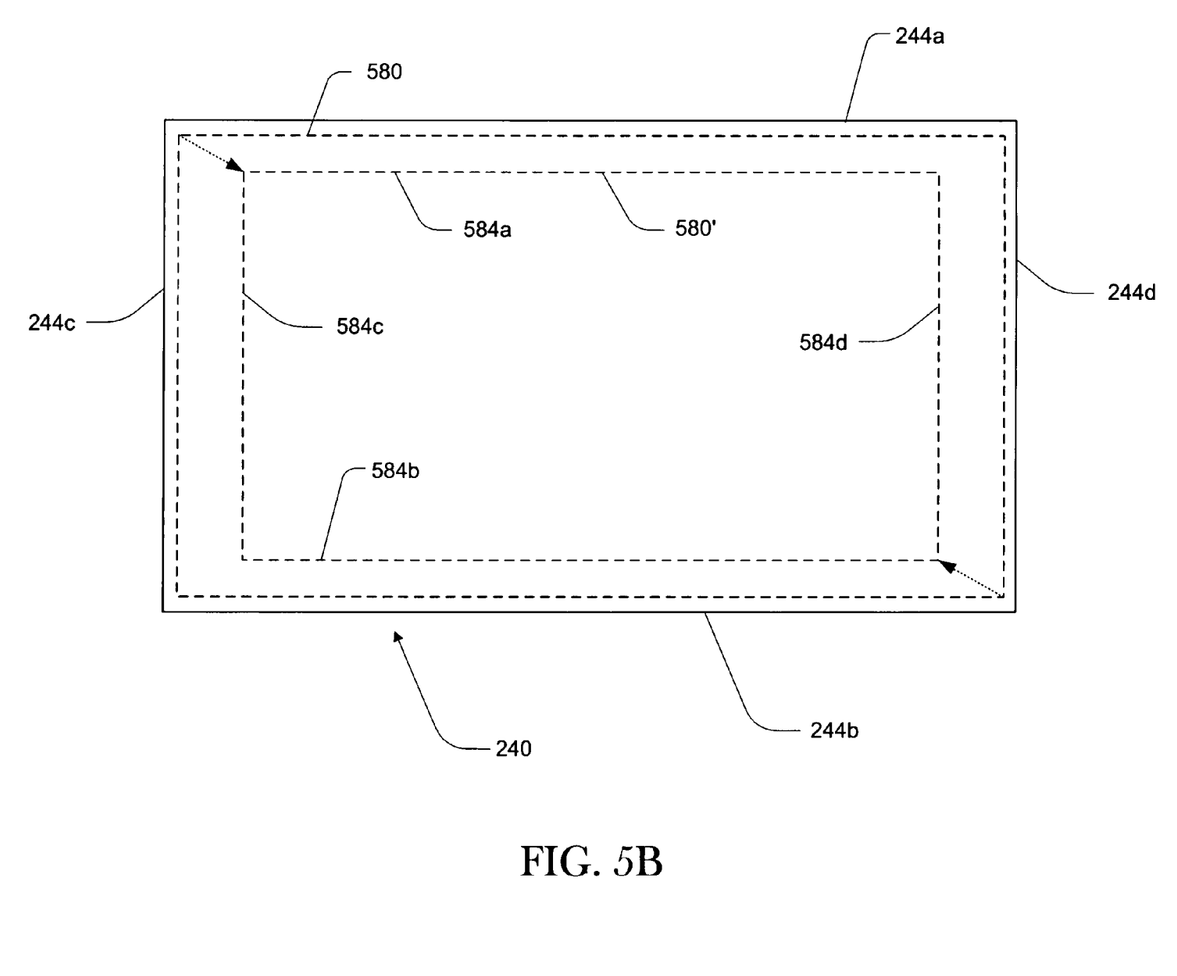

FIGS. 5A-5B are representations of embodiments of available fields of projection 240. FIGS. 5A and/or 5B may depict the available field of projection 240 as projected onto a projection surface. Alternatively, FIGS. 5A and/or 5B may depict a representation of the available field of projection 240 as might be provided on a user interface, such as an LCD display, of a projection system.

FIG. 5A will be used to describe how feedback could be immediately provided to a viewer to visually show what areas of the available field of projection would be inhibited. However, it is noted that there is no need to provide such feedback and the image may simply be displayed without the masked image data as the desired extent of clean-up is entered or altered. As shown in FIG. 5A, the available field of projection 240 has edges 244*a*, 244*b*, 244*c* and 244*d*. Markers 580*a*, 580*b*, 580*c* and 580*d* may be initially displayed adjacent or coincident with the edges 244*a*, 244*b*, 244*c* and 244*d*, respectively. The desired field of view is that area bounded by the markers 580*a*, 580*b*, 580*c* and 580*d*. For use on a projection surface, the markers 580*a*, 580*b*, 580*c* and 580*d* would be superimposed upon a projected image. For use on a graphical user interface, the markers 580*a*, 580*b*, 580*c* and 580*d* could be superimposed upon a representation of the available field of projection 240.

To input the desired extent of clean-up, a viewer could drag or otherwise move the markers 580*a*, 580*b*, 580*c* and 580*d*. While the markers 580*a*, 580*b*, 580*c* and 580*d* are being adjusted to correspond to the desired extent of clean-up determined by the viewer, the projection of light in the areas between the edges 244*a*, 244*b*, 244*c* and 244*d*, and the markers 580*a*, 580*b*, 580*c* and 580*d* could be inhibited. Alternatively, projection of light could be permitted until the user confirmed the placement of the markers 580*a*, 580*b*, 580*c* and 580*d*. Movement of the markers 580*a*, 580*b*, 580*c* and 580*d* could be performed with a variety of input means, such as by numerical entry on a keypad, dials, up/down buttons, etc. If the representation of the available field of projection is displayed on a touch-sensitive graphical interface, for example, the viewer could simply touch the marker and drag it to a new location. FIG. 5A depicts the movement of marker 580*a* to its new location 580*a*', newly defining the desired field of view to be bounded by markers 580*a*', 580*b*, 580*c* and 580*d*. The process of moving the markers could be repeated for each of the edges 244*a*, 244*b*, 244*c* and 244*d*.

FIG. 5B will be used to describe another example of how feedback could be immediately provided to a viewer to visually show what areas of the available field of projection data would be masked. As shown in FIG. 5B, the available field of projection 240 has edges 244*a*, 244*b*, 244*c* and 244*d*. Marker 580 may be initially displayed as a box having edges 584*a*, 584*b*, 584*c* and 584*d* adjacent or coincident with the edges 244*a*, 244*b*, 244*c* and 244*d*, respectively. Alternatively, using a process analogous to cropping images in photo editing applications, a user could generate marker 580 by using a pointing device, such as a computer mouse, to click an initial corner and drag the pointing device to create a box of the desired dimensions. The desired field of view is that area bounded by the marker 580. For use on a projection surface, the marker 580 would be superimposed upon a projected image. For use on a graphical user interface, the marker 580 could be superimposed upon a representation of the available field of projection 240.

To input the desired extent of clean-up, a viewer could drag one or more of the edges 584*a*, 584*b*, 584*c* and 584*d* or otherwise change dimensions of marker 580 as represented by marker 580'. Marker 580/580' may be locked to maintain the aspect ratio of the available field of projection 240 or it may be independent of the aspect ratio of the available field of projection 240. Although the transition from marker 580 to marker 580' is shown to be generally centered, as might occur if all edges were adjusted by the same percentage, marker 580' could be placed anywhere within the available field of projection 240. While the marker 580 is being adjusted to correspond to the desired extent of clean-up determined by the viewer, the projection of light in the areas between the edges 244*a*, 244*b*, 244*c* and 244*d*, and the edges 584*a*, 584*b*, 584*c* and 584*d* of marker 580 could be inhibited. Alternatively, projection of light could be permitted until the user confirmed the placement of the edges 584*a*, 584*b*, 584*c* and 584*d* of marker 580. Movement of the edges 584*a*, 584*b*, 584*c* and 584*d* could be performed such as was described with reference to markers 580*a*, 580*b*, 580*c* and 580*d* of FIG. 5A.

Figure 6:
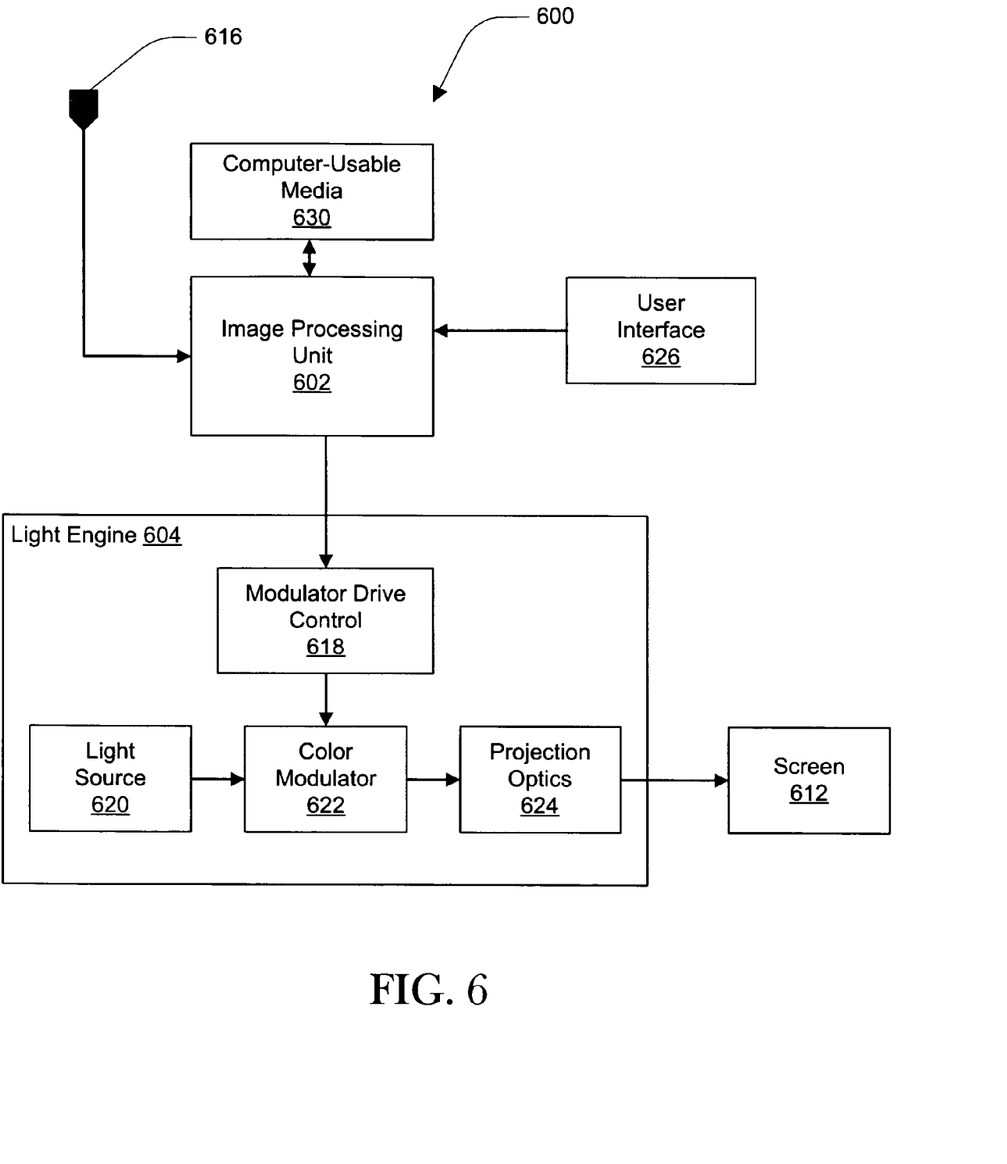
FIG. 6 is a schematic of an embodiment of a projection system in accordance with a further embodiment of the disclosure.

Once a desired extent of clean-up has been defined, thereby defining a desired field of view, the resulting desired field of view may not extend the full width and height of the available field of projection. In such situations, although not necessary, the desired field of view could be scaled to make better use of the available field of projection, thereby providing a viewer with an experience that would more closely match their viewing experience if no edge degradation were to be present. For such embodiments, the processing unit could determine an amount of enlargement of the desired field of view that could be made within the limits of the available field of projection, and then provide control signals to the light engine to cause the desired field of view to project to the full width and/or full height of the available field of projection, depending on whether the aspect ratio of the desired field of view is the same as the aspect ratio of the available field of projection. That is, the image processing unit could remap the image data for the desired field of view to correspond to the full number of pixels of the available field of projection. For example, if the desired extent of clean-up is 2% of the width for each side edge and 1% of the height for each of the top and bottom edges, the desired field of view could be expanded by approximately 2% (1/0.98) to take advantage of the full height of the available field of projection without a change in aspect ratio. Similarly, if the desired extent of clean-up is 2% of the width for each side edge, 4% of the height for the top edge and 0% of the height for the bottom edge, the desired field of view could be expanded by approximately 4% (1/0.96) to take full advantage of the available field of projection without a change in aspect ratio FIG. 6 is a schematic of an embodiment of a projection system in accordance with a further embodiment of the disclosure. Projection system 600 typically includes a light engine 604 having a light source or illumination source 620 configured to direct light along an optical path or light path toward screen 612. Light source 620 may be any suitable device configured to generate light that can be directed toward screen 612. For example, light source 620 may be a single light source, such as a mercury lamp or other broad-spectrum light source. Alternatively, light source 620 may include multiple light sources, such as light emitting diodes (LEDs), lasers, etc.

Light generated from light source 620 further may be directed onto a color modulator 622. Color modulator 622 may be a spatial light modulator, such as a micromirror array, a color filter and/or a multi-colored light source. The color modulator 622 generates colored rays of light for projection on the screen 612 as spots of light. The color modulator 622 controls the average hue, colorfulness and brightness for the light spot for a given frame period or sub-field.

For some embodiments, the color modulator 622 is integral with the light source 620. Alternatively, the color modulator 622 may be independent of the light source 620. Regardless of the configuration, the combination of a light source and a color modulator produces the color light array for projection of an output image onto a projection surface of the screen 612.

Projection system 600 may further include a modulator drive control 618 configured to manage generation of the projected image from the light engine 604 in response to control signals from the image processing unit 602. Light emitted from the light source 620 is modulated by color modulator 622, as directed by modulator drive control 618, and passed through projection optics 624 onto the projection surface of screen 612. Projection optics 624 may include one or more projection lenses. Typically, projection optics 624 are adapted to focus, size, and position the output image on screen 612.

A user interface 626 is provided for entry of the desired extent of clean-up to the projection system. The user interface 626 may be a direct or remote component of the projection system 600. The user interface 626 may further be provided through a host, such as a personal computer, coupled to the projection system 600.

In operation, image data 616 for a desired image is received by the image processing unit 602 from a source. The image processing unit 602 generates control signals for use by the light engine 604 such that the light engine 604 will be directed to project light having the appropriate hue, colorfulness and brightness within the desired field of view, and inhibit projection of light corresponding to masked image data as defined by the desired extent of clean-up.

While the various functionality of the projection system 600 is depicted as corresponding to discrete control entities, it is recognized that much of the functionality can be combined in a typical electronic circuit or even an application-specific integrated circuit chip in various embodiments. For example, the functionality of the image processing unit 602 could be contained within the light engine 604.

It is noted that the image processing unit 602 may be adapted to perform the methods in accordance with the various embodiments in response to computer-readable instructions. These computer-readable instructions may be stored on a computer-usable media 630 and may be in the form of either software, firmware or hardware. In a hardware solution, the instructions are hard coded as part of a processor, e.g., an application-specific integrated circuit chip. In a software or firmware solution, the instructions are stored for retrieval by the processor. Some additional examples of computer-usable media include read-only memory (ROM), electrically-erasable programmable ROM (EEPROM), flash memory, magnetic media and optical media, whether permanent or removable.

What is claimed is:

1. A method comprising:
storing selection data that indicates a defined extent of clean-up for each of a plurality of sources of image data;
selecting an extent of clean-up to use, including:
choosing the defined extent of clean-up for one of the plurality of sources of image data when the one of the plurality of the sources of image data provides image data to a display device, and
using header information to determine when one of the plurality of the sources of image data provides image data to a display device; and,
masking image data displayed by the display device using the selected extent of clean-up.

2. A method as in claim 1 wherein selecting an extent of clean-up to use includes:
determining when one of the plurality of the sources of image data provides image data to a display device based on a physical connection through which the image data is received.

3. A method as in claim 1 wherein the defined extent of clean-up for each of the plurality of sources of image data indicates an amount of masking to be performed on each edge of the image data when displayed by the display device.

4. A method as in claim 1 wherein the display device is a projection display device.

5. A method as in claim 1 wherein selecting an extent of clean-up to use additionally includes:
allowing a user to select an extent of clean-up for any source for which a defined extent of clean-up is not stored.

6. A method as in claim 1 wherein selecting an extent of clean-up to use additionally includes:
allowing a user to override the defined extent of clean-up for any of the plurality of sources of image data by selecting a new extent of clean-up any of the plurality of sources of image data.

7. A display system comprising:
an image processor, the image processor including
storage that stores selection data indicating a defined extent of clean-up for each of a plurality of sources of image data, and
a selector that selects, based on the selection data, an extent of clean-up to use in order to produce masked image data, wherein the selector uses header information to determine when one of the plurality of the sources of image data provides image data to the image processor; and,
a display device that displays the masked image data.

8. A display system as in claim 7 wherein the selector determines, based on a physical connection through which the image data is received, when one of the plurality of the sources of image data provides image data to the image processor.

9. A display system as in claim 7 wherein the defined extent of clean-up for each of the plurality of sources of image data indicates an amount of masking to be performed on each edge of the image data when displayed by the display device.

10. A display system as in claim 7 wherein the display device is a projection display device.

11. A display system as in claim 7 wherein the image processor additionally includes a user interface through which a user selects an extent of clean-up for any source for which a defined extent of clean-up is not stored.

12. A display system as in claim 7 wherein the image processor additionally includes a user interface through which a user can override the defined extent of clean-up for any of the plurality of sources of image data by selecting a new extent of clean-up any of the plurality of sources of image data.

13. A display system comprising:
means for processing an image, including,
means for storing selection data indicating a defined extent of clean-up for each of a plurality of sources of image data, and
means for selecting, based on the selection data, an extent of clean-up to use in order to produce masked image data, wherein the means for selecting uses header information to determine when one of the plurality of sources of image data provides image data to the means for processing; and,
means for displaying the masked image data.

14. A display system as in claim 13 wherein the means for selecting determines, based on a physical connection through which the image data is received, when one of the plurality of sources of image data provides image data to the means for processing.

15. A display system as in claim 13 wherein the defined extent of clean-up indicates an amount of masking to be performed on each edge of the image data.

16. A display system as in claim 13 wherein the means for processing additionally includes means for allowing a user to select an extent of clean-up for any source for which a defined extent of clean-up is not stored.

17. A display system as in claim 13 wherein the means for processing additionally includes means for allowing a user to override the defined extent of clean-up for one of the plurality of sources of image data by selecting a new extent of clean-up.

* * * * *

UNITED STATES PATENT AND TRADEMARK OFFICE
CERTIFICATE OF CORRECTION

PATENT NO. : 8,174,627 B2
APPLICATION NO. : 11/220036
DATED : May 8, 2012
INVENTOR(S) : Frederick D. Taft et al.

Page 1 of 1

It is certified that error appears in the above-identified patent and that said Letters Patent is hereby corrected as shown below:

In column 9, line 18, in Claim 1, after "when" delete "the".

Signed and Sealed this
Twelfth Day of February, 2013

Teresa Stanek Rea
*Acting Director of the United States Patent and Trademark Office*